United States Patent
Jotter et al.

(10) Patent No.: US 7,847,661 B2
(45) Date of Patent: Dec. 7, 2010

(54) ACTUATION MAGNET FOR MOVING A CLOSURE NEEDLE OF A HOT-RUNNER NOZZLE OF AN INJECTION MOLDING TOOL

(75) Inventors: Mathias Jotter, Eutin (DE); Borgar Pfeiffer, Klausdorf (DE); Manfred Rufer, Bosau (DE); Jens Storjohann, Hamburg (DE); Wolfram Heisen, Lütjenburg (DE)

(73) Assignee: Kuhnke Automation GmbH & Co. KG, Malente (DE)

( * ) Notice: Subject to any disclaimer, the term of this patent is extended or adjusted under 35 U.S.C. 154(b) by 0 days.

(21) Appl. No.: 12/125,440

(22) Filed: May 22, 2008

(65) Prior Publication Data

US 2008/0290972 A1   Nov. 27, 2008

(30) Foreign Application Priority Data

May 23, 2007   (DE) ................... 20 2007 007 385 U
Nov. 20, 2007   (DE) ...................... 10 2007 055 578

(51) Int. Cl.
H01F 3/00   (2006.01)
H01F 7/08   (2006.01)
H01F 7/00   (2006.01)
H01F 5/00   (2006.01)

(52) U.S. Cl. ...................... 335/279; 335/220; 335/229; 335/266

(58) Field of Classification Search ................. 335/209, 335/220, 229, 249, 251, 255–256, 261, 266, 335/273, 278–279, 302
See application file for complete search history.

(56) References Cited

U.S. PATENT DOCUMENTS

| 4,653,720 A * | 3/1987 | Knapp et al. ................... 251/65 |
| 4,928,028 A * | 5/1990 | Leibovich ..................... 310/23 |
| 6,933,827 B2 * | 8/2005 | Takeuchi et al. ............. 336/212 |
| 2005/0088265 A1 * | 4/2005 | Nakagawa et al. .......... 335/220 |
| 2005/0100625 A1 * | 5/2005 | Tooman et al. ............... 425/145 |
| 2006/0130785 A1 * | 6/2006 | Han et al. ................. 123/90.11 |
| 2007/0035371 A1 * | 2/2007 | Yamasaki et al. ........... 335/229 |

FOREIGN PATENT DOCUMENTS

| DE | 4409889 A1 * | 12/1994 |
| DE | 4416858 A1 * | 11/1995 |
| DE | 196 08 676 C1 | 1/1997 |
| DE | 102005049022 * | 4/2007 |

* cited by examiner

*Primary Examiner*—Elvin G Enad
*Assistant Examiner*—Mohamad A Musleh
(74) *Attorney, Agent, or Firm*—Panitch Schwarze Belisario & Nadel LLP

(57) ABSTRACT

An actuation magnet is provided for moving a closure needle of a hot-runner nozzle of an injection molding tool. The actuation magnet has an armature which is coupled in movement to the closure needle and may be displaced between first and second cores by subjecting at least one coil to current. A permanent magnet is arranged in a manner such that it exerts an additional magnetic force on the armature in at least one, preferably two, movement directions.

7 Claims, 2 Drawing Sheets

ACTUATION MAGNET FOR MOVING A CLOSURE NEEDLE OF A HOT-RUNNER NOZZLE OF AN INJECTION MOLDING TOOL

BACKGROUND OF THE INVENTION

Fluid injection material is often supplied to injection molding tools or injection molding machines via hot-runner nozzles. Such hot-runner nozzles as a rule comprise a needle closure, i.e., a closure needle is provided in the nozzle and, for closing a nozzle opening, the needle is moved into a position closing the nozzle opening, and is pulled out of this for opening the nozzle. Actuation magnets for moving closure needles need to muster a considerable force for closing the hot-runner nozzle. This leads to a large constructional shape and to an increased electrical consumption.

BRIEF SUMMARY OF THE INVENTION

Against this background, it is an object of the present invention to provide an actuation magnet for moving a closure needle of a hot-runner nozzle of an injection molding tool, wherein given a small construction size, the magnet musters the required travel forces for opening and closing the hot-runner nozzle, and has a reduced electrical power consumption This object is achieved by an actuation magnet having a permanent magnet, which is arranged in a manner such that it exerts an additional magnetic force onto an armature in at least one, preferably two, movement directions. The object is further achieved by a hot-runner nozzle having a closure needle, which is coupled in movement to an actuation magnet of the invention.

The actuation magnet according to one embodiment of the invention, for moving a closure needle of a hot-runner nozzle of an injection molding tool, comprises an armature which is coupled in movement to the closure needle, and may be displaced between a first and second core by way of subjecting at least one coil to current. The coupling between the armature and the closure needle is designed such that the closure needle is moved by the armature. The armature may be connected to a non-magnetic plunger, which actuates the closure needle and in particular is connected to this or is designed as one piece with this.

With the actuation magnet according to one embodiment of the invention, a yoke and/or a soft-magnetically designed housing of the actuation magnet, together with the two cores, as well as the armature, form a magnetically active circuit on subjecting the at least one coil to current. The armature may thus be moved into two travel positions depending on the polarity of the coil, wherein the armature in a first travel position is located near the first core, and in a second travel position is located near the second core, and preferably in the first travel position comes to bear on the first core, and in the second travel position bears on the second core. A closure needle of a hot-runner nozzle, which is formed or attached on the armature, may be moved by this into a position closing the hot-runner nozzle, or a position opening the hot-runner nozzle. The actuation magnet according to one embodiment of the invention is usefully designed as a reverse travel magnet, i.e., the travel position in which the armature is located forms the initial position before the beginning of the travel movement into the other travel position.

According to one embodiment of the invention, the actuation magnet comprises a permanent magnet, which is arranged in a manner such that it exerts an additional magnetic force onto the armature in at least one, preferably in both movement directions. Thus, by way of the permanent magnet, in particular on closing the hot-runner nozzle with the closure needle, i.e., with the travel movement of the armature in the direction of the first core, it is possible to produce an additional travel force increasing with a reducing air gap between the armature and the first core. For this, the permanent magnet may, for example, be part of the magnetically active circuit formed by the yoke and/or housing, one or both of the two cores, and the armature, wherein the permanent magnet is arranged in a manner such that its active direction or its magnetic field is directed such that the permanent-magnetic force on the armature acts in the direction of the travel movement of the armature to the first core. The produced permanent-magnetically active circuit is preferably superimposed on at least one magnetic active circuit, which is produced by the at least one coil, in a manner such that the active directions of both active circuits are in the same directions. In this manner, the magnetic actuation force produced by the coils is amplified. Accordingly, the coil may be dimensioned smaller with regard to its power, i.e., the electrical power consumption may be reduced.

On account of the high thermal loading of the actuation magnet on subjecting the coil to current, which is yet further increased by the comparatively warm surroundings of the hot-runner nozzle, the permanent magnet is preferably arranged in the actuation magnet in a manner such that it provides a retaining force between the armature and at least one, preferably both cores. In this manner, subjection of the coil to current for holding the armature in one of the two travel positions is not necessary. The coil is subjected to current merely for switching over between the two end positions or travel positions, in which the armature is then held alone by the permanent magnetic force. Accordingly, the actuation magnet is designed in a bi-stable manner with this design.

The permanent magnet is arranged in the actuation magnet preferably in a manner such that it forms an additional free pole. This pole is preferably directly actively connected to the armature, and is further preferably a common part of two active circuits, which are produced by the permanent magnet and are independent of one another, of which a first one exerts a retaining force on the armature, which is directed in the direction of the first core, and a second one exerts a retaining force acting on the armature in the opposite direction, i.e., in the direction of the second core. For this purpose, the permanent magnet is arranged in the longitudinal direction, preferably between the two cores.

A further advantageous design of the actuation magnet according to the invention envisages an actuation magnet comprising two coils, which are arranged in a soft-magnetic housing in the direction of its longitudinal axis or spaced from one another in the movement direction of the armature. The two coils may be electrically circuited, such that they may be subjected to current together in the same direction, i.e., both coils upon current subjection then produce a magnetic field directed in the same direction. With this embodiment, both coils are subjected to current for switching over the actuation magnet, wherein the movement direction is changed by switching-over the flow direction. Alternatively, one may also provide two coils which may be subjected to current separately from one another, and be arranged such that the magnetic fields produced by them are directed in opposite directions. With this embodiment, the switch-over of the actuation magnet from the first travel position into the second travel position may be achieved by subjecting the one coil to current, and the movement back from the second travel position into the first travel position may be achieved by subjecting the other coil to current.

In a further design of the actuation magnet according to the invention, a permanent magnet, which is preferably designed in an annular manner, is preferably arranged on the inner side of the housing in the region of the intermediate space between the two coils, and magnetized in the radial direction. One may provide a hard-magnetic annular magnet whose poles are spaced from one another in the radial direction of the annular magnet. This annular magnet is preferably attached in a middle region of the actuation magnet, in which the first and the second coils are spaced from one another in the movement direction of the armature, essentially enclosing the armature on the inner wall of the housing. The magnetic field of this permanent magnet is thus directed essentially normally to the peripheral wall of the armature. One or more rod-like magnets magnetized in the radial direction may be arranged in the peripheral region of the armature, instead of an annular magnet.

The permanent magnet, together with a region of the housing which is arranged between the annular magnet and the first core, the first core, as well as the armature of the actuation magnet, may form a first permanent-magnetically active circuit, whose active direction advantageously runs from the armature to the first core for producing a first retaining force. Furthermore, the permanent magnet further preferably together with a region of the housing, which is arranged between the permanent magnet of the second core, the second core, as well as the armature of the actuation magnet, may form a second permanent-magnetically active circuit, whose active direction for mustering a second retaining force runs from the armature to the second core.

Preferably, the armature at its first axial end is designed as a flat armature and faces a correspondingly formed flat surface of the first core. The armature at its second opposite axial end is designed as a cone armature and faces a correspondingly conically shaped surface of the second core.

The design of the armature as a flat armature at an axial end means that the armature there has a planar surface which extends preferably normally to the longitudinal axis or movement axis of the armature and which runs parallel to an oppositely lying flat upper side of the first core. In this manner, a planar working air gap is created between the armature and the first core. The armature is designed as a cone armature at the opposite axial end, i.e., it comprises at least one active surface running obliquely to the longitudinal axis or movement axis of the armature and lying opposite a correspondingly oblique surface of the second core, which preferably runs parallel to this active surface. The obliquely running active surface of the armature and the opposite obliquely running surface of the second core are preferably in each case designed in an annular manner, so that these oblique or conical surfaces form part of a cone superficies. Thereby, the shape of the cone armature ideally defines the shape of a truncated cone, wherein, as the case may be, a planar active surface of a smaller diameter remains in the inside of the conical surface, and this active surface preferably lies opposite a corresponding flat surface of the second armature. This means that with this embodiment, the working air gap between the second core and the armature at least in sections, extends obliquely to the movement axis of the armature, preferably in an annular manner, defining the surface of a truncated cone.

Preferably, the first axial end of the armature and the first core lying opposite this are designed geometrically differently compared to the second axial end of the armature and the facing second core, in a manner such that with a first travel movement of the armature to the first core compared to a second travel movement of the armature to the second core, different travel force-path characteristics may be realized here, which are adapted to the particular requirements on moving a closure needle for opening and closing a hot-runner nozzle. An actuation magnet is created by this, which, given a relatively small constructional size, provides adequately large forces for opening and closing a hot-runner nozzle with a closure needle.

By way of the fact that the armature at its first axial end is designed as a flat armature, which, with a travel movement into a first travel position, is moved onto a likewise flatly designed surface of the first core, one may realize a characteristic line of the magnetic force with this travel movement, with which the magnetic force increases steeply to a large value in a last phase before reaching the travel position, i.e., shortly before contacting of the first axial end of the armature and the first core. This essentially corresponds to the force course, which is required for closing the hot-runner nozzle. Accordingly, with the closure movement of the closure needle, the flat axial end is moved in the direction of the corresponding flat surface of the first core and is brought to abutment there.

With a second opposite travel movement of the armature, with which its second, conically designed axial end is moved into an inner cone formed on the second core, one may realize such a linear course of the travel force, with which the friction forces acting on the closure needle on opening the hot-runner nozzle are essentially compensated.

The invention further relates to a hot-runner nozzle which may be reliably opened and closed by coupling the movement of a closure nozzle with the actuation magnet according to the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

One should note that, in each case, only one half of the cross section of the rotationally symmetrical actuation element is shown in the figures.

DETAILED DESCRIPTION OF THE INVENTION

Figure 1:
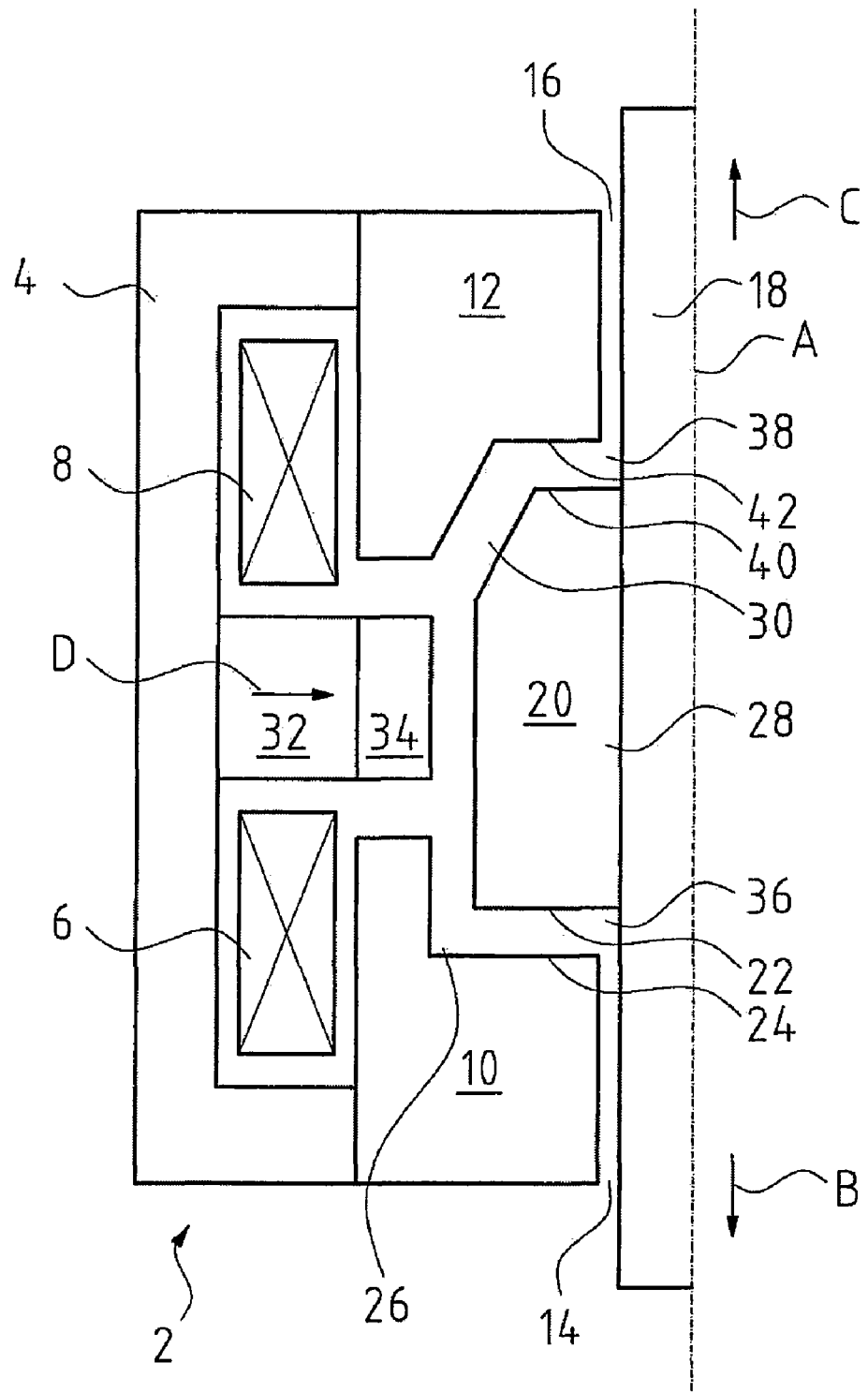
FIG. 1 is a sectioned schematic representation of an actuation magnet for moving a closure needle of a hot-runner nozzle of an injection molding tool according to a first embodiment of the invention.

First, a first embodiment of the invention is described by way of FIG. 1. The actuation magnet 2 represented in FIG. 1 comprises a soft-magnetic, cylindrical yoke or housing 4. A first coil 6 which may be subjected to current, and a second coil 8 which may be subjected to current, which are spaced from one another in the direction of the longitudinal axis A, are in each case arranged in the housing 4 about a longitudinal axis A of the housing 4. The coils 6 and 8 are connected electrically in series, so that they may be subjected to current in the same direction.

The housing 4 in each of its two end-sides, concentrically to its longitudinal axis A, comprises an opening, wherein a first, soft-magnetic core 10 projects into a first opening, and a second, soft-magnetic core 12 projects into a second opening, into the housing 4. The core 10 comprises a through hole 14, and the core 12 comprises a through hole 16, concentrically to the longitudinal axis A of the housing 4.

A non-magnetic plunger 18, which actuates a closure needle for opening and closing a hot-runner nozzle (not shown in the drawing figure) or merges into such a nozzle, is guided in a linearly movable manner in the direction of the longitudinal axis A, in the through hole 14 of the core 10 as well as in the through hole 16 of the core 12. The plunger 18 is attached to an armature 20 of the actuation magnet 2, which is arranged between the cores 10 and 12 coaxially to these, and is movable between the cores 10 and 12 in the direction of the longitudinal axis A.

The first axial end of the armature 20 which faces the core 10, is designed in a flat manner. Accordingly, the armature 20 at this axial end comprises a flat end-face 22. The first core 10, corresponding to this flat end-face 22, comprises a flat surface 24, which faces the armature and which is formed by an indented end-face of a hollow-cylindrical recess 26 formed on the core 10. The end-face 22 and the flat surface 24 extend normally to the longitudinal axis A.

The second axial end of the armature 20, which faces the second core 12, is conically designed in the shape of a truncated cone 28. Corresponding to this, the core 12 is designed as a cone core, wherein it has an inner cone 30 at its end which faces the armature 20.

A permanent magnet 32 is attached between the coils 6 and 8, on the inner wall of the housing 4 peripherally surrounding the armature 20. This permanent magnet 32 is designed as a radially magnetized annular magnet, which extends over the whole inner periphery of the housing 4. A likewise annular, soft-magnetic pole part 34 is arranged on the inner periphery of the permanent magnet 32 which faces the armature 20.

The manner of operation of the actuation magnet 2 according to the invention is hereinafter described by way of FIG. 1. The housing 4, the core 12, the armature 20, as well as the core 10, by subjecting the coils 6 and 8 to current, form a first, soft-magnetically active circuit, in which a magnetic force acts, directed in direction B or in direction C, depending on the polarization of the coils 6 and 8.

The permanent magnet 32, which is magnetized such that its magnetization points to the armature 20 in the direction D, simultaneously produces a first hard-magnetically active circuit which, proceeding from the permanent magnet 32, extends over the pole part 34, the armature 20, the core 10 as well as the housing 4. Furthermore, the permanent magnet 32 produces a second, hard-magnetic active circuit. This extends from the permanent magnet 32, the pole part 34, the armature 20, the core 12, and the housing 4.

If the closure needle of the hot-runner nozzle with the plunger 18 of the actuation magnet 2 is to be moved into a position closing the hot-runner nozzle, the coils 6 and 8 are subjected to current in a manner such that magnetic force acting in the direction B is produced in the soft-magnetically active circuit. In this manner, the armature 20 with the plunger 18 attached thereto is moved in the direction B, wherein the air gap 36 between the armature 20 and the core 10 is reduced in size. On account of the flat design of the axial end of the armature 20, which faces the core 10, with the flat end-face 22 and the flat surface 24 of the core 10 corresponding thereto, given a reducing air gap 36, a force progression of the magnetic force or travel force results, with which the travel force increases first only insignificantly, but in a steep manner shortly before contact of the end-face 22 with the flat surface 24. This increase of the travel force in the end phase of the travel movement is increased by the permanent magnet 32, with which a likewise increasing magnetic force is superimposed on the soft-magnetically produced travel force given a decreasing air gap 36.

The subjection of the coils 6 and 8 to current may be finished when the armature 26 has reached its end position, and in this example, when the end-face 22 of the armature 20 contacts the surface 24 formed on the core 10, in the travel position, since the magnetic force produced by the permanent magnet 32 holds the armature 20 in the travel position, bearing on the core 10.

If the closure needle of the hot-runner nozzle with the plunger 18 of the actuation magnet 2 is to be moved into a position releasing the hot-runner nozzle, the coils 6 and 8 are together subjected to current in a reverse manner, such that a magnetic force acting in the direction C is produced in the soft-magnetically active circuit. The armature 20 with the plunger 18 attached thereto is moved in the direction C by this force, wherein an air gap 38 between the armature 20 and the core 12 is reduced in size. A linear progression of the force of the magnetic force or travel force, which is adapted to the progression of a counter-force produced by frictions forces on removal of the closure needle from the injected material, results with a reducing air gap 36, on account of the conical design of the axial end of the armature 20, which faces the core 12, and of the inner cone 30 of the core 12, which corresponds thereto.

As soon as the armature has reached this desired second end position, and in this example an end-face 40 formed on the truncated cone 28 of the armature 20 contacts a surface 42, complementary to this, of the inner cone 30 formed on the core 12, in the travel position, then the subjection of the coils 6 and 8 to current may also be switched off in this travel position, since the magnetic force produced by the permanent magnet 32 holds the armature 20 in the travel position bearing on the core 12.

The armature 20 at its two end positions, i.e., either at the core 12 or the core 10, in each case is held purely via the permanent-magnetically produced force. This means that a soft-magnetic force, which is opposed to this permanent-magnetic retaining force and exceeds this, must be produced by the coils 6 and 8 for moving the armature. Then, on account of the ever increasing air gap 36 and 38 on removing the armature 20 from the core 10 or the core 12 respectively, the permanent-magnetic retaining force at an axial end of the armature 20 reduces, while it simultaneously increases at the opposite side to which the armature 20 is moved.

The progression of the force in the movement direction C may be adapted optimally to the application purpose or the forces for opening the hot-runner nozzle, which are to be overcome, by changing the inclination angle of the cone surface at the second axial end of the armature 20 as well as the corresponding surface of the inner cone 30 in the core 12.

Figure 2:
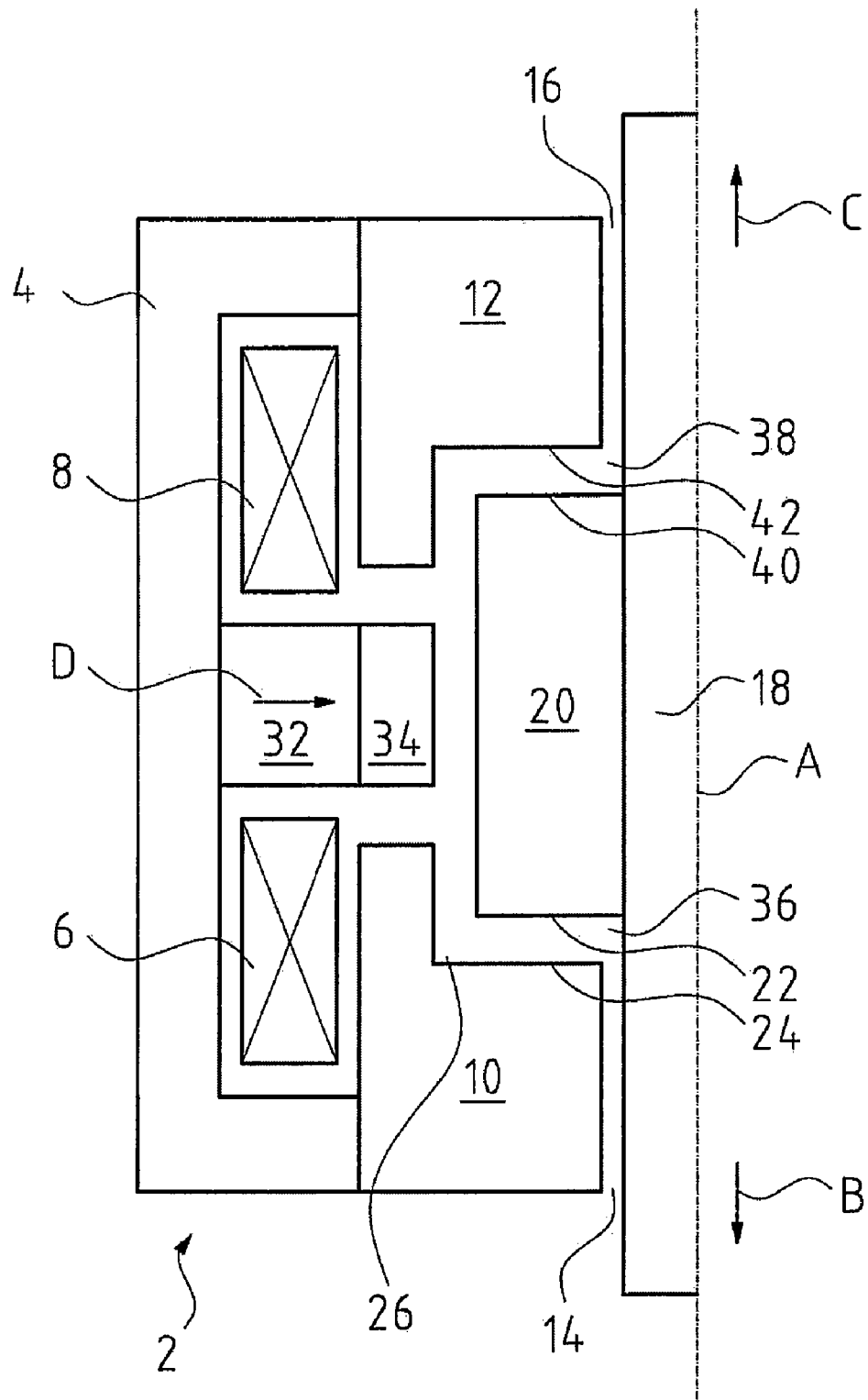
FIG. 2 is a sectioned schematic representation of an actuation magnet for moving a closure needle of a hot-runner nozzle of an injection molding tool according to a second embodiment of the invention.

The second embodiment according to FIG. 2 differs from the previously described embodiment in that the armature 20 at its two ends is designed as a flat armature. This means that the armature 20 here is designed in a symmetrical manner, and comprise two equal ends. One may also design both ends as a cone armature instead of as a flat armature. Accordingly, the second core 12 with the embodiment shown in FIG. 2 may also be designed in a flat manner. Alternatively, both cores 10 and 12 could also be designed as cone cores.

With this symmetrical design, actuation forces are produced, which are equal in both movement directions. Otherwise, the manner of functioning of the actuation magnet according to FIG. 2 does not differ from the manner of functioning of the actuation magnet according to FIG. 1, which is why the preceding description is referred to. Accordingly, in FIG. 2, the same reference numerals are used for identical parts which have been described by way of FIG. 1.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An actuation magnet (2) for moving a closure needle of a hot-runner nozzle of an injection-molding tool, the actuation magnet comprising an armature (20) coupled in movement to a closure needle (18), the armature being displaceable between first and second cores (10, 12) by subjecting at least one coil (6, 8) to current, the armature (20) at a first axial end being designed as a flat armature and facing a correspondingly designed flat surface (24) of the first core (10), and the armature (20) at a second opposite axial end being designed as a cone armature and facing a correspondingly conically shaped surface of the second core (12), and a permanent magnet (32) arranged in a manner such that it exerts an additional magnetic force on the armature (20) in at least one movement direction (B, C), the actuation magnet (2) being bistable.

2. The actuation magnet (2) according to claim 1, wherein the permanent magnet (32) is arranged in a manner such that it provides a retaining force between the armature (20) and at least one of the first and second cores (10, 12).

3. The actuation magnet (2) according to claim 1, wherein the permanent magnet (32) is arranged in the actuation magnet (2) in a manner such that it forms an additional free pole.

4. The actuation magnet (2) according to claim 1, wherein the actuation magnet (2) comprise two coils (6, 8) arranged spaced from one another in the movement direction (B, C) of the armature (20) in a soft-magnetic housing (4) of the actuation magnet (2).

5. The actuation magnet (2) according to claim 4, wherein at least one permanent magnet (32) is arranged on an inner side of the housing (4) in a region of an intermediate space between the two coils (6, 8), and wherein the permanent magnet is magnetized in a radial direction.

6. The actuation magnet (2) according to claim 5, wherein at least one permanent magnet (32) is annular in shape.

7. A hot-runner nozzle comprising a closure needle coupled in movement to an actuation magnet (2) according to claim 1.

* * * * *